US008565938B2

(12) United States Patent
Coulmeau et al.

(10) Patent No.: US 8,565,938 B2
(45) Date of Patent: Oct. 22, 2013

(54) METHOD OF OPTIMIZING A FLIGHT PLAN

(75) Inventors: François Coulmeau, Seilh (FR); Guy Deker, Cugnaux (FR); Hervé Goutelard, Vallauris (FR)

(73) Assignee: Thales, Neuilly sur Seine (FR)

(*) Notice: Subject to any disclaimer, the term of this patent is extended or adjusted under 35 U.S.C. 154(b) by 1027 days.

(21) Appl. No.: 12/130,267

(22) Filed: May 30, 2008

(65) Prior Publication Data
US 2008/0300738 A1    Dec. 4, 2008

(30) Foreign Application Priority Data
Jun. 1, 2007    (FR) ...................................... 07 03912

(51) Int. Cl.
G01C 23/00   (2006.01)
G05D 1/00    (2006.01)
G05D 3/00    (2006.01)
G06F 7/00    (2006.01)
G06F 17/00   (2006.01)
G06F 19/00   (2011.01)
G06G 7/70    (2006.01)
G06G 7/76    (2006.01)

(52) U.S. Cl.
USPC .............................................. 701/3; 701/120

(58) Field of Classification Search
USPC .................................. 701/3, 4, 120
See application file for complete search history.

(56) References Cited

U.S. PATENT DOCUMENTS

| 5,121,325 A | 6/1992 | DeJonge |
| 6,085,147 A * | 7/2000 | Myers ........................ 701/528 |
| 6,181,987 B1 | 1/2001 | Deker et al. |
| 6,507,782 B1 | 1/2003 | Rumbo et al. |
| 2003/0139875 A1 * | 7/2003 | Baiada et al. ................ 701/120 |
| 2005/0283281 A1 * | 12/2005 | Hartmann et al. ................ 701/4 |
| 2007/0078572 A1 | 4/2007 | Deker et al. |
| 2007/0142981 A1 | 6/2007 | Gutierrez-Castaneda et al. |
| 2007/0150170 A1 | 6/2007 | Deker |
| 2007/0179703 A1 | 8/2007 | Soussiel et al. |
| 2007/0219678 A1 | 9/2007 | Coulmeau |
| 2007/0219679 A1 | 9/2007 | Coulmeau |
| 2007/0225876 A1 | 9/2007 | Caillaud et al. |

FOREIGN PATENT DOCUMENTS

| EP | 0236587 | 9/1987 |
| EP | 0250140 | 12/1987 |
| EP | 0637787 | 2/1995 |

* cited by examiner

Primary Examiner — Thomas Tarcza
Assistant Examiner — Imran Mustafa
(74) Attorney, Agent, or Firm — Lowe Hauptman & Ham, LLP

(57) ABSTRACT

A method of optimizing a flight plan of an aircraft used in a flight management system of an aircraft is disclosed. This method makes it possible to constrain the real cost index of the mission executed to the optimal cost index $CI_{opt}$ predetermined by the aircraft operator, by acting on objectives $ETA_{opt}$ and $EFOB_{opt}$ of values of ETA and of EFOB to be achieved. Objectives are linked to this optimal cost index, in order to make the system return from a cost index $CI_m$ to the optimal cost index $CI_{opt}$, while taking account of various constraints imposed by the ATC or the CTFM. Both constraints $m_{ext}$ influence the cost index and constraints which limit the field of possible solutions.

14 Claims, 8 Drawing Sheets

FIG.4

METHOD OF OPTIMIZING A FLIGHT PLAN

RELATED APPLICATIONS

The present application is based on, and claims priority from, French Application Number 07 03912, filed Jun. 1, 2007, the disclosure of which is hereby incorporated by reference herein in its entirety.

FIELD OF THE INVENTION

The present invention relates to aircraft flight management systems designated by the acronym FMS, and more particularly a method for optimizing a flight plan generated by such systems.

BACKGROUND OF THE INVENTION

These flight management systems FMS are well known. They make it possible to generate the flight plan of an aircraft on each mission, taking account of the parameters specific to the aircraft and to the flight conditions such as the payload, the weight of the aircraft, the quantity of fuel onboard, the temperature, the wind etc., and of the time constraints imposed by the air traffic control bodies ATC: required departure and/or arrival timeslot.

The flight plan notably describes all the waypoints or positions above which the aircraft is to pass, with the altitude and corresponding speed at each waypoint. It supplies a vertical flight profile for the various phases of the aircraft, typically the climb phase CLB, the cruise phase CRZ and the descent phase DES, as illustrated schematically in simplified form in FIG. 1. Depending on this vertical profile, notably the speed over the ground and the cruising altitude correspond to each of the phases. The climb phase typically begins at the time $t_{CLB}$ to stop at the time $t_{TOC}$, at the TOC (Top Of Climb) point at which the aircraft reaches cruising altitude $ALT_{CRZ}$; the cruise phase extends between the time $t_{TOC}$ and the time $t_{TOD}$, the latter corresponding to the TOD (Top of Descent) point at which the aircraft begins the descent DES to landing at the destination.

Flight management systems are more recently known that also use economic criteria, taking the form of a Cost Index CI. This cost index is in fact an optimization criterion between the Cost of Time CT in $/minute for example, and the Cost of Fuel CF in $/kg for example. The Cost Index is defined by CI=CT/CF, with normal values lying between 0 and 999 (in kg/minute with the units indicated above).

The value of this cost index for an aircraft and a given mission is determined according to criteria specific to each operator, and constrains notably the rules for determining the altitudes and speeds of the flight plan (vertical profile of the flight plan).

Typically, a cost index CI equal to zero corresponds to a situation in which the cost of time CT is considered to be negligible relative to the cost of fuel CF: planning the flight will consist in seeking speeds low enough to consume as little as possible, and the flight duration will thereby be longer. For an operator, this typically corresponds to flights of the long haul type.

A cost index CI equal to 999 corresponds to an opposite situation, in which the cost of fuel CF is considered to be negligible relative to the cost of time CT: planning the flight will consist in seeking the shortest flight duration, even if the consumption of fuel must be high. For an operator, this typically corresponds to flights of the shuttle type, to allow a maximum number of rotations, or else to ensure an earlier arrival time in case of lateness or of a precise landing slot.

In practice, a cost index is calculated by an operator:

by determining the cost of time CT: the operator includes the operating costs including notably, but not exclusively, the amortization of the machines and equipment, taxes included; the hourly salaries of the crews and of the duty staff; the flight taxes (on-route, airports, security, etc.) and the service expenses (weather forecasting, assistance, etc.); the cost of the connections impacted in management of computer networks central node ("hub" management); the cost of delays (hotel, passenger transfer and compensation, meals or meal compensations expenses, etc.); the cost of insurance; the cost of lateness (airport fire cover, standby duty/activation of controllers, security services, ground support) and taxes according to arrival times; aircraft maintenance (regular inspections); impact of crew hours (rest times, maximum monthly flying time, etc.).

by determining the cost of fuel CF: this involves the unit cost of fuel at the airport where the aircraft is filled up, which includes the cost of the fuel margins taken away.

For an operator, the cost index CI reflects the search to optimize the operating cost, as a function of the type of flight (medium range, long haul, shuttle, charter, etc.), that is to say an optimum between the cost of time and the cost of fuel. A flight management system FMS onboard an aircraft will compute the flight predictions for a given mission as a function of the data input by the pilot, including the optimum cost index CI determined by the operator for this flight, as a function of the parameters listed above. In this manner, an optimal flight plan according to the economic criteria of the operator is obtained.

However, during a mission, additional temporary constraints of air traffic management or constraints imposed by the crew, may cause the aircraft to depart from the optimal flight plan. In particular, an air traffic controller may notably:

modify the flight plan or give manual flight instructions of the "vector" type for matters of traffic management (resolution of conflicts, maintaining separation, sector optimization), of weather, of runway occupancy management on arrival, etc.

modify the speed of the aircraft for reasons of coordination, of separation between aircraft in a control sector or between adjacent control sectors;

impose a timetable constraint, of time, on a waypoint or a particular point of the flight plan, for example, on the destination point or the initial approach point: this imposes a cost index called the RTA (Required Time of Arrival), which is no longer an optimal index for the operator since it takes account of a constraint imposed by air traffic control ATC.

The flight parameters for a flight phase may also be modified by the crew for internal reasons, and by the air traffic controller for air traffic management reasons. For example:

the climb phase CLB may be modified for traffic reasons. For example, it is possible to impose the fastest possible climb to cruising level beginning at the top of climb point TOC;

the cruise phase CRZ may be modified for example to respond to constraints of optimizing fuel consumption (operating economy) or of managing the reserve of fuel on arrival: a different altitude and a slower cruising speed than the initially predicted altitude and speed may be imposed.

All these actions have the effect that the flight plan actually followed differs from the optimal flight plan: the initial optimal cost index of the operator that is one of the parameters for determining the optimal flight plan will not be maintained:

the aircraft will arrive either too early or too late, with a quantity of fuel remaining onboard that is different from the optimal estimates.

In addition, the cost of time CT is normally considered to be a monotonic function of the time, as illustrated in FIG. 2a, whereas in reality the total cost of time CT of an aircraft for a given mission is a complex function G(t), as illustrated as an example in FIG. 2b. Specifically, depending on whether the aircraft arrives in the required arrival timeslot, or outside this timeslot, that is to say before or after, with a greater or lesser time difference, the consequences on the cost of time may in reality be very different. Notably it is possible to express this difference by a component ΔC of the cost of time which reflects the failure to adhere to the arrival timeslot required by air traffic management ATM. This component ΔC of non-adherence may in practice result in an increase or else a reduction in the total cost of time.

This component of non-adherence is illustrated in FIG. 2c, in which $RTA_{min}$ and $RTA_{max}$ are marked as the lower and upper limits of the arrival timeslot imposed by the ATM bodies of air traffic management, that is typically a few minutes before (for example 2 minutes before) and a few minutes after (for example 3 minutes after) the required time of arrival at destination RTA.

The cost of time differential ΔC of non-adherence then reflects the fact that the failure to maintain the required time of arrival at destination, that is to say when the aircraft arrives ahead of time, before $RTA_{min}$ or late, after $RTA_{max}$, has effects on the management of the flight personnel, maintenance, or the expenses of diversion to another airport and the implications on the departure or arrival timeslots of other aircraft etc. These effects will often result in an increased operating cost (a positive cost differential) that is an increasing function of the delay.

But this component ΔC may also be negative, that is to say cause a reduction in the total cost of time. This will for example be the case if a flight 1 arrives late on its arrival timeslot after a time $t_{mc}$ (mc used to signify "missed connection"): the connection with a subsequent flight 2 which should normally have taken onboard passengers from flight 1, is missed: flight 2 leaves, in its normal timeslot. After this time $t_{mc}$, the cost of non-adherence to the required timeslot will then sharply reduce but without descending to the cost with adherence to the timeslot (even if, in the long term, this has a negative economic impact for the company due to the discontent of the passengers left at the gate who will potentially choose another company for their future flights). This is illustrated by the curve ΔC as a function of the arrival time illustrated in FIG. 2c.

The curve G(t) of the total cost of time (FIG. 2b), as a function of the flight time is in practice defined by an operator relative to its own management constraints, and relative to the constraints and limits of air traffic management (ATFCM: "Air Traffic Flow and Capacity Management").

But the current flight management systems are not able to take account of the optimal cost index CI determined by the operator for a given mission, to generate a corresponding optimal flight plan with notably an estimate of the time on arrival and of the fuel remaining on arrival. Therefore, modifications of the flight plan during the mission that cause a non-adherence to the arrival timeslot may not be taken into account by these systems, which results on arrival in a real cost index $CI_r$ that is different from the optimal value $CI_{opt}$ determined by the operator.

According to the prior art, there are no tools onboard the aircraft that make it possible to make up the difference between the real cost index and the optimal cost index predetermined by the operator. And the flight management system has no means that could make it possible to return to the CT and CF indices from the CI. Therefore the crews onboard the aircraft do not have at their disposal tools making it possible to "make up" a difference of cost relative to the optimal cost index predetermined by the operator. They only have the difference in cost of fuel.

SUMMARY OF THE INVENTION

The technical problem that the invention proposes to solve is a method for optimizing the flight making it possible to render the flight management system FMS capable of optimizing flight plan parameters during the flight, for the purpose of keeping closer to the optimal cost index estimated for this flight, even though one or more flight phases are modified during the mission.

A solution to this technical problem has been found in the invention, by associating with each of the two parameters of cost of time CT and cost of fuel CF a corresponding variable that the flight management system is able to compute. It involves, for the cost of time CT, estimating the time of arrival at destination, marked ETA, and that is linked to the cost of time by a curve like that illustrated in FIG. 2b and, for the cost of fuel, estimating the fuel remaining onboard at destination and marked EFOB. The management system is able to compute these variables ETA and EFOB at the beginning of the mission, when $CI_{opt}$ has been entered into the system, and is able to recompute these two variables throughout the mission as a function of the path already completed and the remaining path.

For a given mission and aircraft, there is the ability to allocate to each cost index CI value a pair of values ETA and EFOB, as a function of the initial flight parameters: this gives a parametric curve of which each point on the curve connects ETA, EFOB values that can be computed by the flight management system FMS to a cost index CI, for initial flight parameters that are known and whose optimal point of operation corresponds to the optimal cost index value computed by the operator, and gives the corresponding optimal values of estimated time of arrival at destination $ETA_{opt}$ and of quantity of fuel remaining onboard at destination $EFOB_{opt}$ (FIG. 3).

The modification of the flight parameters results in moving the operating point outside its optimal position, outside the initial known parametric curve.

The idea at the base of the invention is therefore to create an overriding of the values ETA and EFOB throughout the flight plan to the values $ETA_{opt}$ and $EFOB_{opt}$ corresponding to this optimal operating point in order, and in the case of a noted difference, to apply a corrective cost index by which the flight management system will recompute a flight strategy that will lead to reducing or cancelling out the noted difference. The application of a corrective cost index may be treated as a local time constraint, which temporarily invalidates the optimal cost index CI. The optimal cost index is again found when this time constraint disappears: this means that the system has again found its optimal operating point.

As characterized, the invention therefore relates to a method for optimizing an optimal flight plan of an aircraft relative to a predetermined cost index, the predetermined cost index inducing optimal values of an arrival time and of a quantity of fuel remaining on board that are estimated to destination for the flight plan and the predetermined cost index. It comprises a process of overriding the time and quantity of fuel remaining estimated to destination on the optimal arrival time and quantity of fuel remaining values, the process comprising at least, at each flight phase of the flight plan, a step of computing current estimated values to destination of arrival time and quantity of remaining fuel on detection of at least one external constraint modifying the flight plan, and their difference from the optimal values, and the overriding process supplying as an output a corrective cost index that is applicable on at least a portion of the remaining flight time, and a corresponding modified flight plan.

According to the invention, the overriding criteria use a strategy based on any type of cost that can be modelled in a flight management system, such as the cost of time CT and/or the cost of fuel CF and/or as the cost of nuisances.

Since the environment of an aircraft is very constrained, a solution with a single degree of liberty given by the cost index of the mission may in practice be insufficient to fully satisfactorily correct the noted difference.

To broaden the space of the solutions, provision is made advantageously to divide some or all of the flight plan into M segments of flight time, M being at least equal to two, and to associate an elementary cost index with each segment obtained. This then gives a field of solutions with M degrees of liberty, at least two. A corresponding method of optimization includes:

a step of segmenting the optimal flight plan into M segments, M being an integer at least equal to 2, the segments being defined over one, several or all of the flight phases of the flight plan, a step of associating with each segment j thus defined, j being an integer from 1 to M, of an elementary cost index on this segment, set at the value of the predetermined cost index, and, on detection of one or more external constraints modifying the flight plan, the overriding process supplies as an output a corrective elementary cost index M-uplet, each corrective cost index having to be applied as a new elementary cost index on the associated flight plan segment j.

Various divisions may be adopted depending on the case. For example, it could be decided not to work on the climb and descent phases that often need to be optimized locally with respect to the aircraft and air traffic control (e.g.: rapid climb for the climb phase CLB, throttle-back descent for the descent phase DES), and to divide the cruise phase CRZ into two segments (M=2).

In another example, M is chosen to be at least equal to 3, and the division forms a first segment 1 corresponding to the climb flight phase, N segments forming the cruise flight phase, N being an integer at least equal to 1 and an Mth segment M corresponding to the descent flight phase.

Advantageously, the method of the invention also makes it possible to take account of a cost of time CT component that does not depend only on the time constraints but also on operating constraints, such as the obligation to maintain the aircraft, the time limit reached by a crew, the closing times of an airport, the required time slot on arrival, etc., by the definition of a field of possible cost index solutions incorporating the various constraints. Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 3:
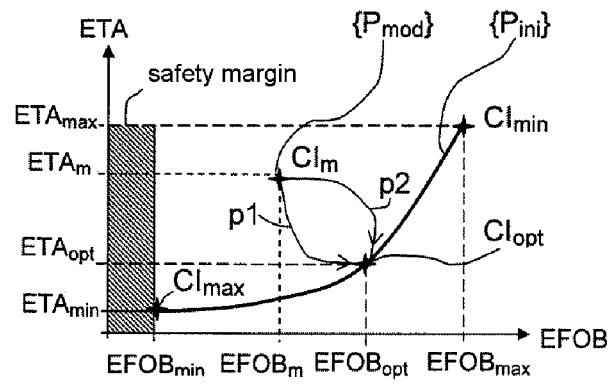
FIG. 3 illustrates a parametric curve used by an optimization method according to the invention that may be defined for an aircraft and a given mission, and which makes it possible to link a cost index of this aircraft to an estimated time of arrival at destination and to an estimated quantity of fuel remaining onboard at destination.

FIG. 3 illustrates a parametric curve used in the invention. This curve gives a correspondence between the values of the cost index of a given aircraft, for a given mission, and the corresponding pair (estimated time of arrival at destination ETA, quantity of fuel remaining onboard at destination).

This curve can be determined in a simple manner once the initial flight parameters $\{P_{init}\}$ are known that are necessary for planning the mission in question, which notably include the movement constraints, the air corridors to be used, whether or not certain devices of the aircraft are to be used (flaps, air conditioning) and navigation tools of the aircraft such as the STAR (Standard Instrument Arrival Route) and the SID (Standard Instrument Departure), the weight of the aircraft, the cruising altitude, etc.

This curve notably includes the optimal operating point marked $CI_{opt}$, corresponding to the cost index determined by the operator for the given mission.

It is to this optimal operating point that the optimization method according to the invention will seek to be overridden.

This optimal point $CI_{opt}$ has as its coordinates ($ETA_{opt}$, $EFOB_{opt}$) on the parametric curve computed by the flight management system FMS for the aircraft and the mission in question, for the initial flight parameters $\{P_{init}\}$: $ETA_{opt}$ is the estimated value of the optimal estimated time of arrival ETA (relative to a given time frame of reference), and $EFOB_{opt}$ is the estimated value of the quantity of fuel remaining onboard at destination.

It should be noted on the parametric curve (FIG. 3) that the maximal cost index point $CI_{max}$ corresponds to a situation in which the aircraft will go as quickly as possible without concern for fuel consumption. This situation must however take account of an imposed safety fuel reserve, below which it is not normally possible to descend: this constraint then gives a pair of corresponding values ETA, EFOB: $ETA_{min}$, which gives the earliest possible time of arrival, considering the fuel reserve constraint; $EFOB_{min}$ being equal to this imposed safety reserve.

The field indicated in cross-hatching in the figure indicates the safety reserve constraint.

When there is a modification of the flight instructions (speed, cruising altitude, etc.), that necessarily causes a modification of the "operating" point on the curve: the flight management system is capable of estimating the new values $ETA_m$ and $EFOB_m$, as a function of the modified flight parameters $\{P_{mod}\}$. These values define for example the point that will be called $CI_m$ and that is outside the parametric curve of FIG. 3, corresponding to the initial flight parameters $\{P_{init}\}$.

The optimization method of the invention then consists in reducing as much as possible or even eliminating the difference between $CI_m$ and $CI_{opt}$, by acting on the time and fuel (typically by acting on the speeds and rates of climb), by an overriding operation that seeks a corrective cost index which makes it possible to minimize the difference (ETA-$ETA_{opt}$, EFOB-$EFOB_{opt}$) so as to return, after the correction that may be seen as a local time constraint imposed by the overriding loop OL, to the optimal operating point $CI_{opt}$ of coordinates ($ETA_{opt}$,$EFOB_{opt}$). This may for example be done by first optimizing $ETA_m$ then $EFOB_m$ (path "p1"), or by first optimizing $EFOB_m$ then $ETA_m$ (path "p2") (FIG. 3). Those skilled in the art know how to use such a overriding in a flight management system FMS based on computing the estimates of the ETA and EFOB values as a function of a corrective cost index $CI_{corr}$ by using any known technique of numerical overriding computation. If the correction makes it possible to return to the original optimal operating point, the flight management system may then continue with the original optimal cost index $CI_{opt}$: the correction then acts as a local time constraint, that may be more or less long, applied to a portion of the flight time. Depending on the case, the correction may be obtained on the flight time.

Figure 4:
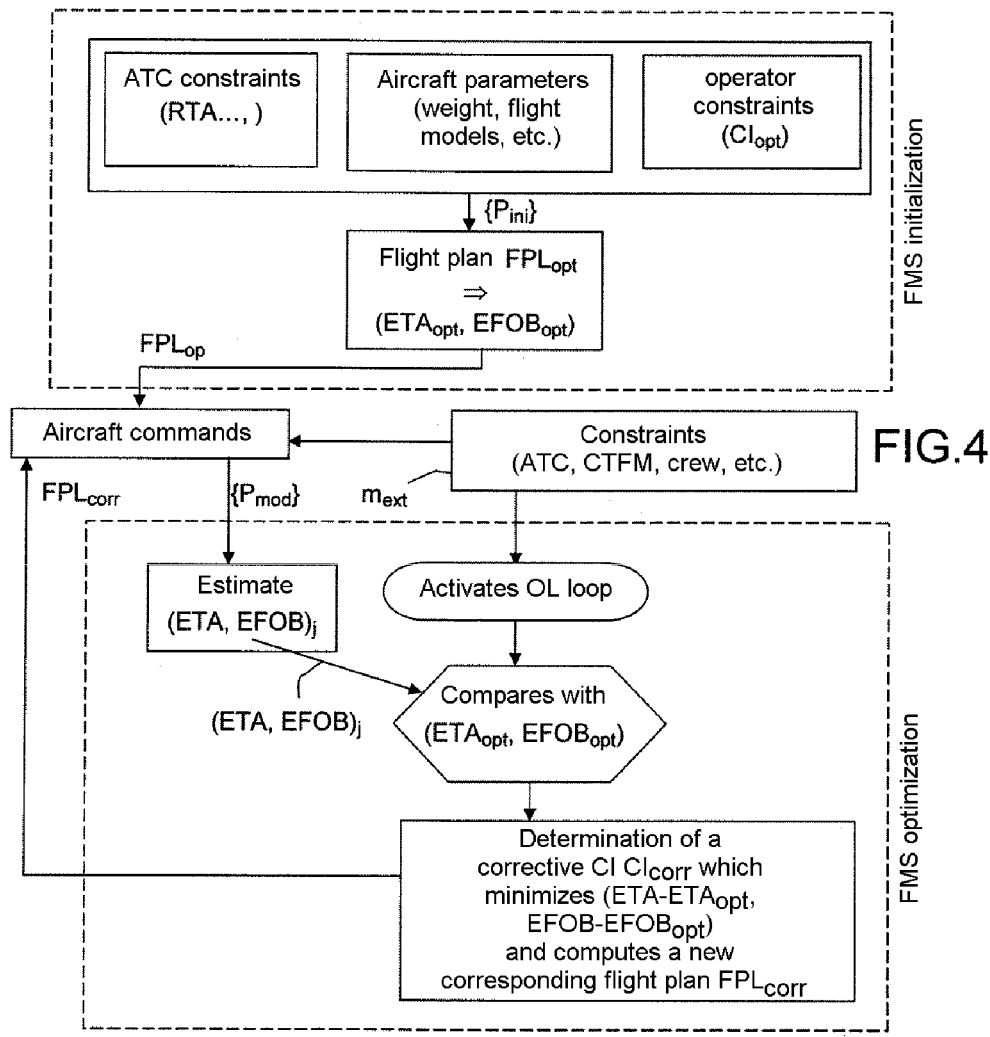
FIG. 4 is a general block diagram of an optimization method according to the invention.

Therefore, as schematized in the flowchart of an optimization method according to the invention shown in FIG. 4: in an initialization phase, the flight management system FMS computes an optimal initial flight plan, $FPL_{opt}$, as a function of initial flight parameters $\{P_{init}\}$ associated with an optimal flight strategy.

In an optimization phase of the flight management system according to the invention, any external constraint $m_{ext}$ (ATC, crew, etc.) activates an optimization loop OL according to the invention, in which the flight management system:

recomputes the estimations of the $ETA_m$ and $EFOB_m$ values of the time of arrival at destination, and of the fuel remaining at destination, taking account of the flight parameters $\{P_{mod}\}$ modified by the constraints $m_{ext}$;

computes the difference from the optimal values: ($ETA_m$-$ETA_{opt}$) and ($EFOB_m$-$EFOB_{opt}$);

determines a corrective cost index $CI_{corr}$ which makes it possible to minimize each of the two differences ($ETA_m$-$ETA_{opt}$, $EFOB_m$-$EFOB_{opt}$). This determination is achieved using in the determination the modified flight parameters $\{P_{mod}\}$ as modified by the constraints $m_{ext}$.

Based on this corrective index $CI_{corr}$, and on the flight parameters $\{P_{mod}\}$, the management system computes a corrected flight plan $FPL_{corr}$ with which are associated corresponding commands of the aircraft that are applied for a sufficient time to obtain the total or at least partial compensation for the detected difference.

As soon as the time constraint disappears, that is to say as soon as the difference is cancelled out, there is a return to the optimal cost index and the optimal flight plan.

In practice, this local time constraint is reflected by the use locally of an instruction that modifies the flight plan $FPL_{mod}$ until, if possible, there is a return to the initial flight plan $FPL_{init}$. The modification will typically relate to the vertical trajectory and the longitudinal speed profile (all phases).

It is possible mathematically to formulate the optimization method as the resolution of the following equation EQ1:

$$\dot{x}(t) = f(t, x(t), u(t)) \text{ and } \inf_{\substack{u \in U \\ x^u(t_0)=x_0}} \int_{t_0}^{t_1} F(t, x^u(t), u(t))dt$$

where x is the aircraft state vector and u is the aircraft command vector and which consists in seeking u(t) between the initial moment t0 when the state vector x of the aircraft is x0 and the moment t1, which minimizes a cost function F, under constraints, x(t) being the time derivative to the first order of the state x.

In the problem of flight optimization by the company, the cost function F is similar to the cost index CI which is a function as has been seen of the cost of time CT and the cost of fuel CF (CI=CT/CF).

The predetermined cost index, requested by the operator and entered by the pilot into the flight management system, is known. It is marked $CI_{opt}$. This optimum cost index is normally applicable to the totality of the flight plan. It is on the basis of this cost index $CI_{opt}$, that is therefore applied to all the flight phases and other flight parameters and air traffic control ATC constraints, that the flight management system FMS will compute in a known manner an optimal flight plan $FPL_{opt}$ (FIG. 4). This flight plan includes the estimation for each of the waypoints, that are noted Wpi, of the flight plan to be overflown, of the corresponding altitude and speed at the time of overflight, and the estimation of the arrival time at this waypoint and of the quantity of fuel remaining at this waypoint. Notably, the flight management system estimates these values at the destination point, which gives $ETA_{opt}$ and $EFOB_{opt}$.

According to the invention, these two values $ETA_{opt}$ and $EFOB_{opt}$ are therefore used as "objectives" to be achieved, considering them to be representative of the cost of time CT and of the cost of fuel CF in order to override the flight plan to the cost index $CI_{opt}$ that is sought. This principle of optimization that is at the basis of the invention is applied according to the general method explained above with reference to FIG. 4.

For a better understanding of the invention, the optimization method according to the invention is illustrated below in three situations. In these three situations there is an instruction modification $m_{ext}$ in the climb phase CLB in order to more quickly reach the top of climb altitude marking the end of the climb phase, demanded by the ATC to solve a problem of closeness of aircraft over the airport of departure.

Figure 5A:
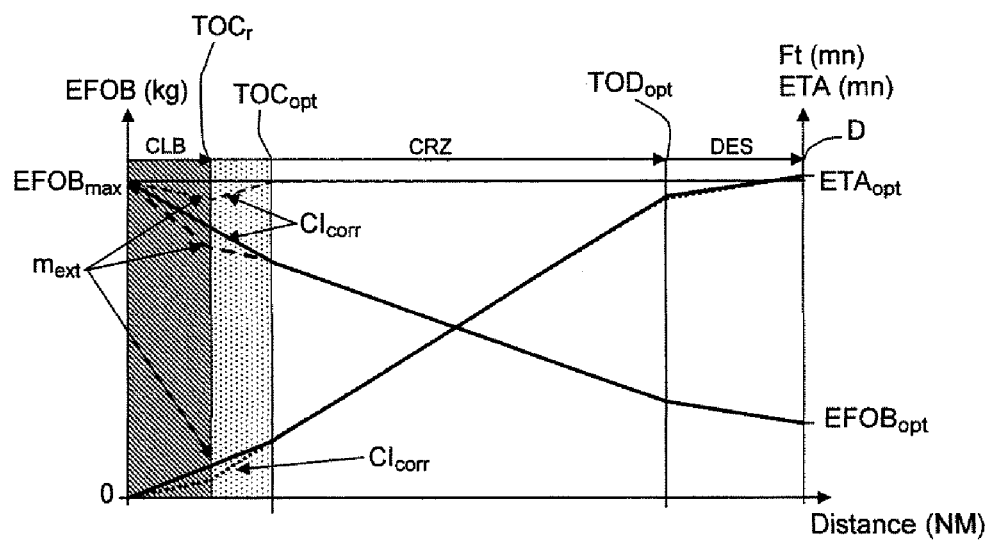
FIGS. 5a and 5b illustrate a first situation in which a local constraint, imposed in the climb, is fully compensated for by an optimization method according to the invention, in the climb phase.
Figure 5B:
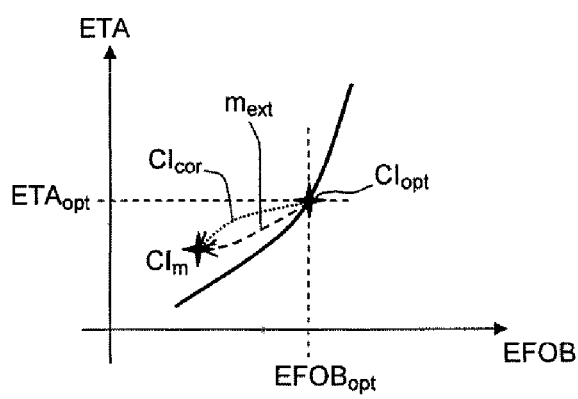

FIGS. 5a and 5b illustrate a first situation in which the correction according to the optimization method according to the invention can be obtained in the climb phase itself, by application of a corrective cost index in this phase: the optimization method applies a time constraint only on the climb phase CLB after which there is a return to the optimal flight conditions defined for the optimal cost index $CI_{opt}$ so that at the point D of arrival at destination the optimal values $ETA_{opt}$ and $EFOB_{opt}$ of the optimal operating point of FIG. 3 are obtained.

More precisely, FIG. 5a shows the evolution of the values of the EFOB (in kg), of the ETA (in minutes) and of the flight time FT (in minutes) as a function of the distance (in nautical miles).

In this example, it has been seen that air traffic control ATC imposes as a constraint $m_{ext}$ on the pilot to return to his cruising altitude as quickly as possible: following this constraint, the aircraft reaches this altitude $ALT_{CRZ}$ at a point $TOC_r$ arriving earlier in the flight time FT than predicted, relative to the optimal top of climb point $TOC_{opt}$, computed for the optimal cost index value $CI_{opt}$. This external constraint typically induces an increase in the vertical speed in the climb phase until the $TOC_r$ point is reached, permitted by a reduction of the longitudinal speed, which leads to a reduction of the estimated time of arrival and a shorter distance over the ground covered at this top of climb point $TOC_r$ and has the effect of greater fuel consumption to reach this point, hence a reduced EFOB (remaining fuel) at this point. As soon as the aircraft has reached the $TOC_r$ point, the controller's constraint is lifted: subsequently, by propagation effect, the modification of the flight plan following the external constraint $m_{ext}$ leads to destination values $ETA_m$ and $EFOB_m$ at the destination point D that differ from the optimal values $ETA_{opt}$ and $EFOB_{opt}$.

An optimization computation according to the invention shows that it is then possible to compensate for the difference directly in the climb phase of the optimal flight plan, that is typically in the time space filled with dots in FIG. 5a between $TOC_r$ and $TOC_{opt}$, by applying a corrective cost index $CI_{corr}$ which makes it possible to return to the optimal values ($ETA_{opt}$, $EFOB_{opt}$) at destination D. The correction made can be reflected by simplifying by an increase in ground speed of the aircraft between the points $TOC_r$ and $TOC_{opt}$, such that the travelling time at $TOC_{opt}$ is identical before and after correction of the initial flight plan.

Subsequently, that is to say in this instance in the cruise phase CRZ and descent phase DES of the optimal flight plan FPopt, the aircraft follows the corresponding flight instructions. Finally, the $CI_{opt}$ is complied with for the mission.

FIG. 5b shows the effect of the external constraint $m_{ext}$ (in dashes) on the slippage of the operating point of the cost index, and of the cost index correction $CI_{corr}$ (in dots) on the climb phase to return to the optimal operating point $CI_{opt}$ ($ETA_{opt}$, $EFOB_{opt}$).

Figure 6A:
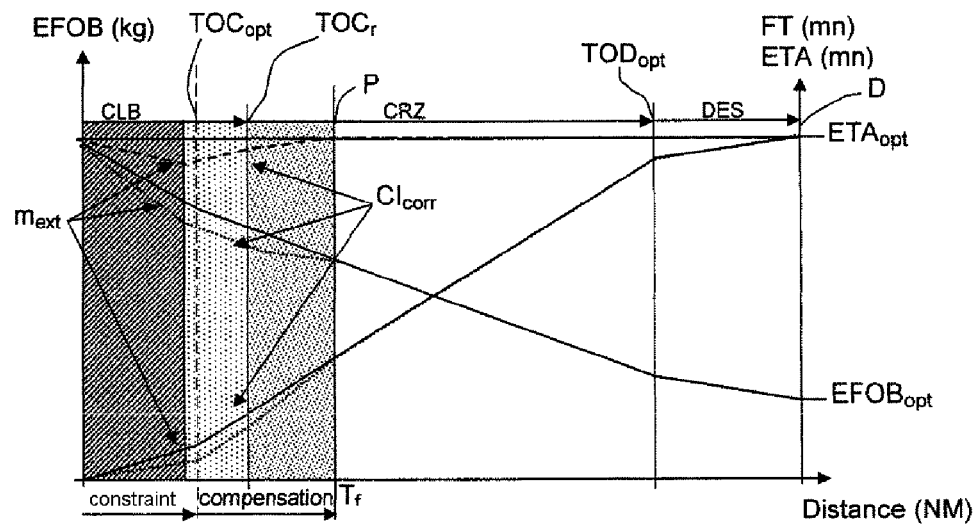
FIGS. 6a and 6b illustrate another situation in which a local constraint, imposed in the climb, is fully compensated for by an optimization method according to the invention, in the climb phase and a portion of the cruise phase.
Figure 6B:
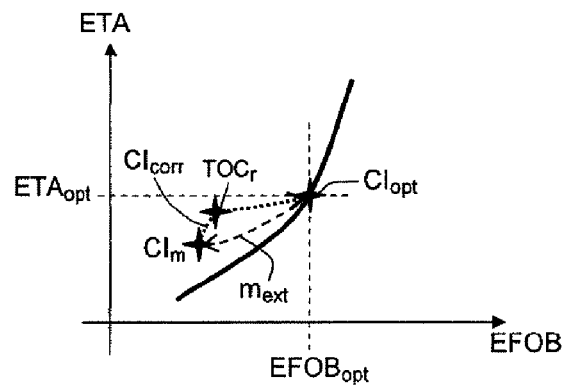

FIGS. 6a and 6b illustrate another situation which differs from the foregoing in that the correction cannot be obtained only on the climb phase. In other words, there is a propagation of the external constraint due to the impossibility to correct on the climb phase only. In the example, the external constraint on the climb phase consisted in imposing a lower ground speed leading to a higher climb rate than predicted on the optimal flight plan: the top of climb point is reached at the $TOC_r$ point for a flight duration and distance covered over the ground that are longer than those predicted for the optimal top of climb point $TOC_{opt}$.

The correction made makes it possible to reduce the difference on the curves FT, ETA and EFOB as a function of the distance covered, partially over the climb phase beginning from the $TOC_{opt}$ point to the $TOC_r$ point and over the cruise phase, between points $TOC_r$ and P. The difference is cancelled out at the point P.

FIG. 6b shows the effect of the external constraint $m_{ext}$ (in dashes) on the slippage of the operating point of the cost index, and of the cost index correction $CI_{corr}$ (in dots) that is applied on the climb and cruise phases to return to the optimal operating point $CI_{opt}$($ETA_{opt}$, $EFOB_{opt}$).

Figure 7A:
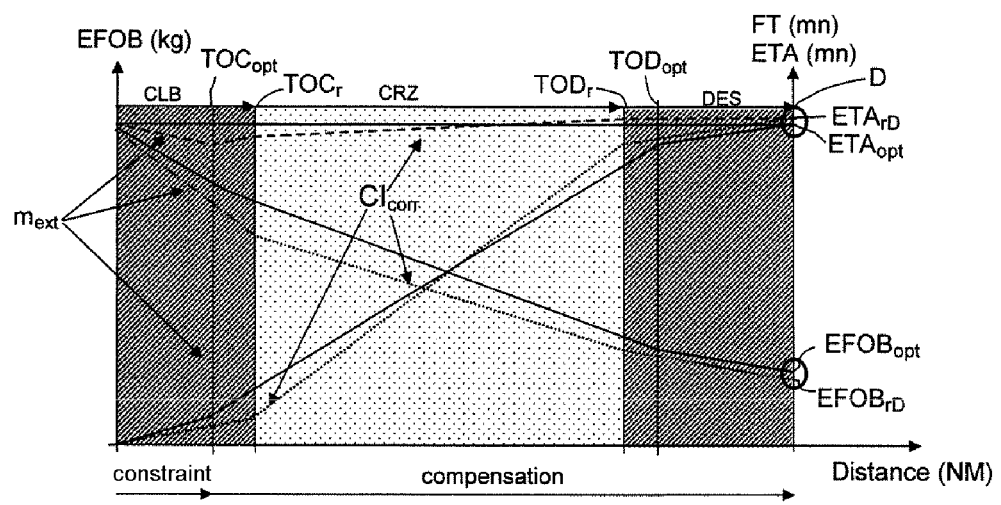
FIGS. 7a and 7b illustrate another situation in which a local constraint may be only partially compensated for, because of a limitation of the field of the possible cost index values.
Figure 7B:
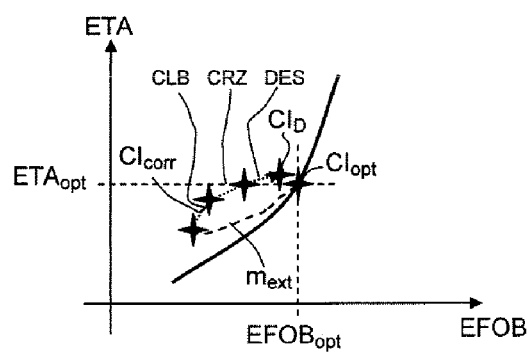

FIGS. 7a and 7b illustrate a third situation in which the optimization method according to the invention can make it possible to minimize the difference due to a constraint, without making it possible to cancel it out completely. This corresponds typically to a practical situation in which the constraints imposed for the mission will be too high. For example, shortly after departure, the ATC could impose a speed limit for the descent phase in the terminal maintained area TMA, for example 250 knots (250 kts), for reasons of flow regulation and better aircraft separation capability (the aircraft have similar relatively slow speeds and have greater latitude for accelerating or decelerating).

In these conditions, the overriding loop OL (FIG. 4) will not find a corrective index value $CI_{corr}$ that makes it possible to totally compensate for the difference. The optimization method according to the invention will however minimize this difference, by applying a compensation to the climb, cruise and descent phases. When arrived at the destination point D, the arrival time ETAD and the quantity of fuel remaining onboard EFOBD differ from the optimal values $ETA_{opt}$ and $EFOB_{opt}$ as indicated in FIGS. 7a and 7b.

Figure 1:
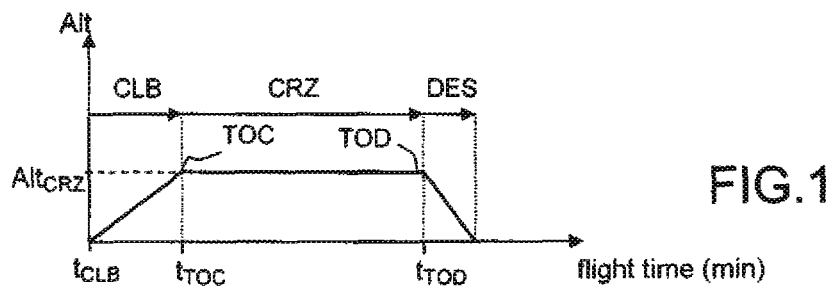
FIG. 1 illustrates schematically a vertical trajectory of an aircraft flight plan.
Figure 2A:
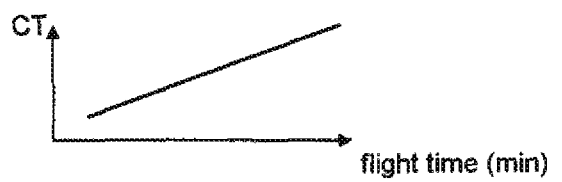
FIGS. 2a to 2c give examples of cost of time curves (FIGS. 2a and 2b) and of cost of non-adherence (FIG. 2c), for a mission, as a function of the flight time of an aircraft.

In practice, in its search for compensation, the optimization loop works on a predefined field of admissible solutions that comprises notably the limit values $EFOB_{min}$, $ETA_{min}$ and $ETA_{max}$ illustrated and defined above with reference to FIG. 3: specifically it is not allowed to choose a correction that would have the effect of exceeding these values $EFOB_{min}$, $ETA_{min}$ and $ETA_{max}$. These limit values are connected (FIG. 3) by a curve which makes it possible to pass from one to the other while complying in the best way possible with the conditions of the optimal cost index $CI_{opt}$: changing from cost to time and from to cost to fuel. The optimum is determined in this family of possible cost indices. An illustration of the correction that can be applied in the field of possible solutions, according to the cost analysis criterion used, is given in FIG. 8a: optimum with respect for $ETA_{opt}$, optimum with respect for $EFOB_{opt}$, optimum with reference to the flight cost=balance between cost of time and cost of fuel. This figure corresponds to a monotonic evolution of the cost of time CT, with the flight time, as illustrated in FIG. 2a.

Figure 2B:
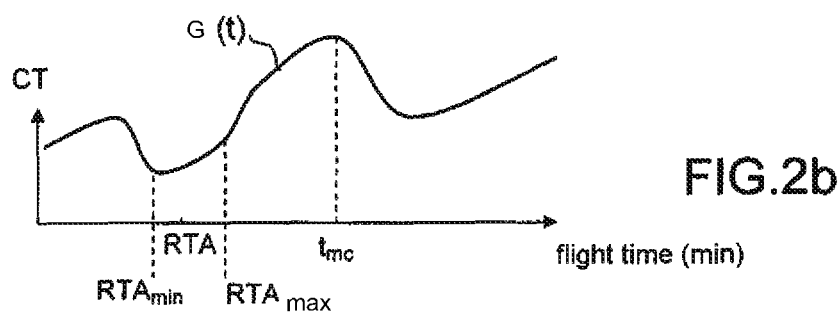
Figure 2C:
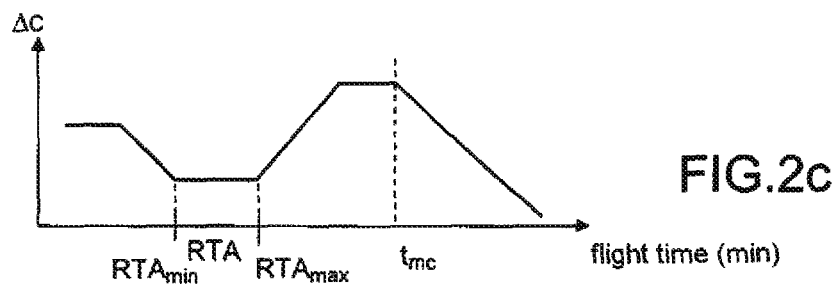
Figure 8B:
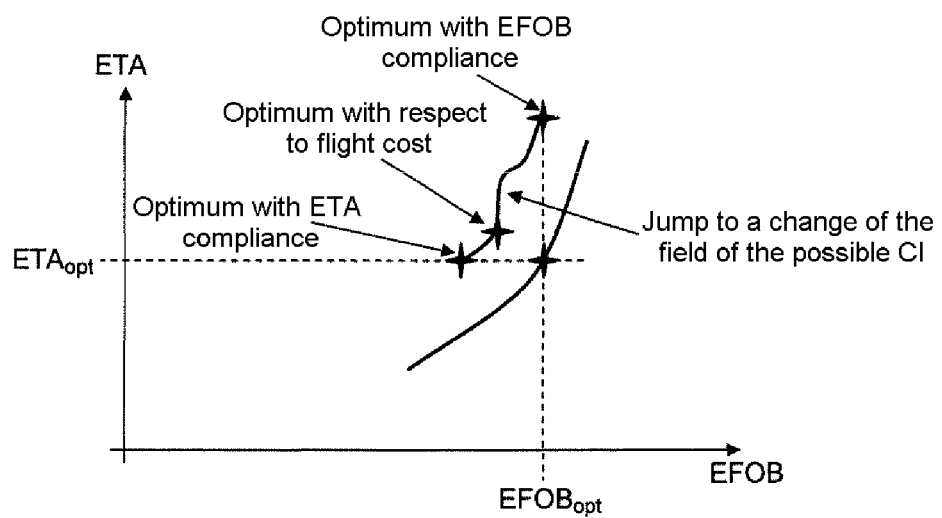
Figure 9A:
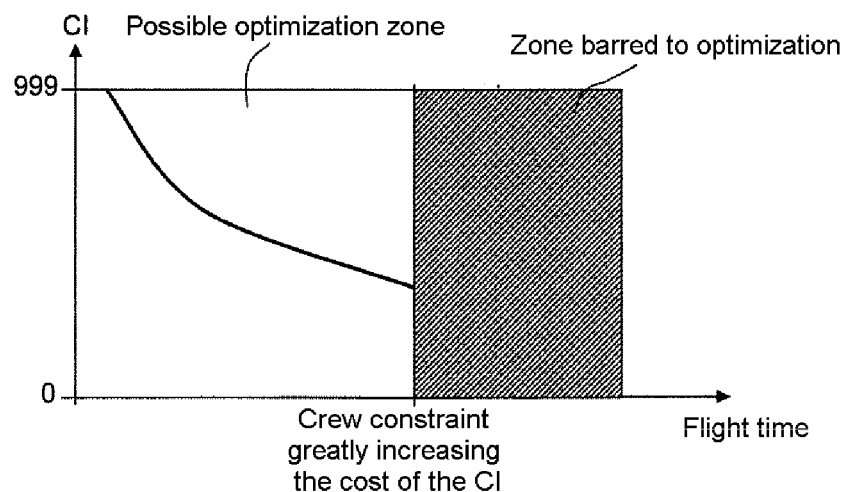
FIGS. 9a and 9b illustrate examples of limitation of the field of cost index values.
Figure 9B:
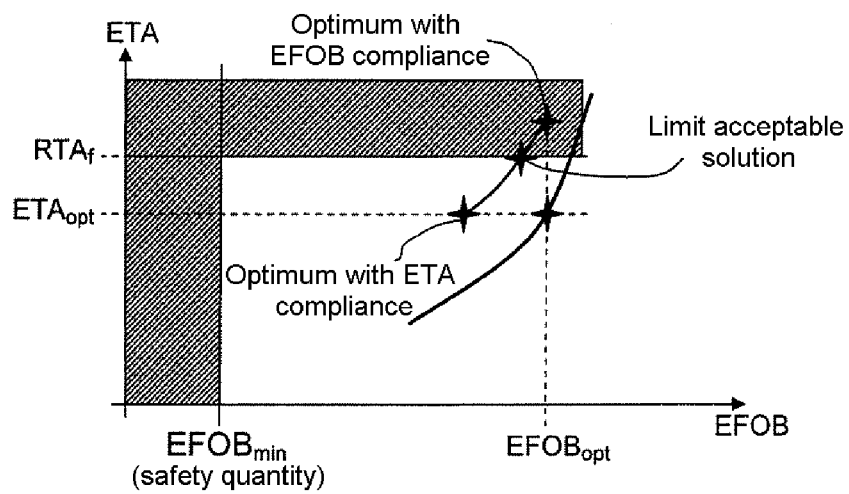

Furthermore, it has been seen that, in reality, the cost of time is a complex function G (t) of time, as illustrated as an example in FIG. 2b, that an operator can compute in advance, or approximate, for each mission. In a refinement of the invention, the optimization method of the invention uses this complex curve G(t) of the cost of time to determine the optimum solution with respect to the adopted cost analysis criterion, as illustrated in FIGS. 2b and 2c. Consideration is then no longer given only to the optimal point $CI_{opt}$ as a constraint, but also the variation of the cost of time as a function of the time constraints imposed on the mission (necessity of an additional rest time, payment of overtime, etc.), which introduce non-linearities in the optimization function, that is to say jumps in the field of the possible solutions, as illustrated in FIG. 8b. FIG. 9a gives an example of the limitations of the field of possibilities that may be applied, and FIG. 9b gives their effects in the determination of the solution.

An optimization method according to the invention therefore makes it possible to comply in the best way possible with a time/fuel objective computed by the company, the optimal cost index $CI_{opt}$, despite modifications $m_{ext}$ of one or more portions of the flight plan, for internal (crew) reasons or external (air traffic control) reasons. It also makes it possible to anticipate cost of time impacts that are both positive and negative depending on the time of arrival at destination relative to a required arrival at destination window predicted by an air traffic flow and capacity management (ATFCM) system as illustrated and explained with reference to FIGS. 2b, 2c and 8b.

An example of a practical and advantageous embodiment of the invention is now described with reference to FIGS. 10a and 10b.

This advantageous embodiment makes it possible to pass from a system of resolution of the equation EQ1 with 1 degree of liberty, the cost index CI, to a system of resolution of the equation EQ1 with M degrees of liberty. In this embodiment, the cost index takes the form of a vector of corrective cost indices. It consists in segmenting some or all of the flight path into M portions, M being an integer at least equal to two, and in associating an elementary cost index with each portion.

Different division strategies may be adopted depending on the flight in question. Notably it may be applied to one, several or all of the flight phases.

Figure 10A:
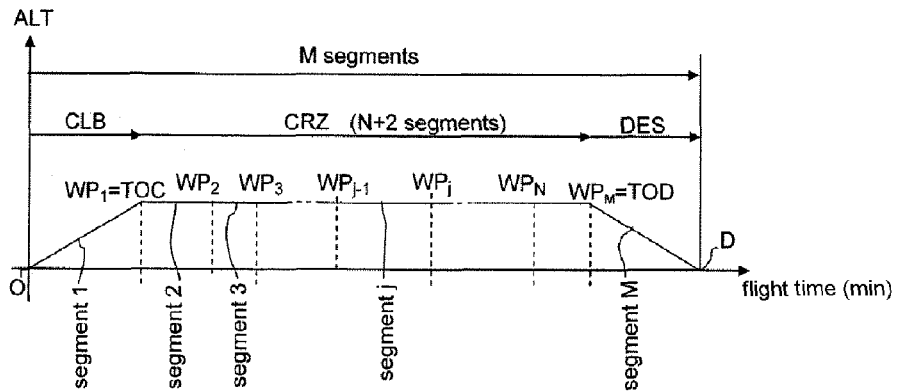
FIGS. 10a and 10b illustrate a refinement of the invention according to which the flight plan is segmented into M segments making it possible to obtain a space of solutions with M degrees of liberty.

In an example of division illustrated in FIG. 10a, a division into M at least equaling three corresponding to the three flight phases is carried out, and more generally equal to M=N+2 portions: one portion corresponding to the climb phase CLB, N portions corresponding to the cruise phase CRZ, N being an integer at least equal to 1, and one portion corresponding to the descent phase DES. In practice, and as illustrated in FIG. 10a, the various portions or segments may be easily delimited by taking for example the various waypoints $WP_i$ to be overflown and the characteristic points such as the top of climb point (TOC) and the top of descent point (TOD), entered or computed in the flight plan $FPL_{opt}$: the first portion is therefore delimited between the point of departure and the top of climb point $TOC_{opt}$, the next segment is delimited by the waypoints $WP_1$ $WP_2$ and so on until the last portion delimited by the top of climb point indicating the beginning of the descent phase $TOD_{opt}$ to the point $WP_M$ equal to the destination point D.

In another division example (not illustrated), it has been decided not to work on the climb and descent phases that often need to be optimized locally with respect to the aircraft and air traffic control (e.g.: rapid climb for Climb, descent with engine throttled back for the descent phase), and to divide the cruise phase into M=2 portions.

After the division, there are M flight portions or segments.

The optimization method matches an elementary cost index CI(j), j=1 to M, j being an integer point of the corresponding segment j in the flight plan, with each portion. This gives M elementary cost indices CI(j), or a vector of M cost indices, to resolve the equation, and no longer a single index.

Figure 10B:
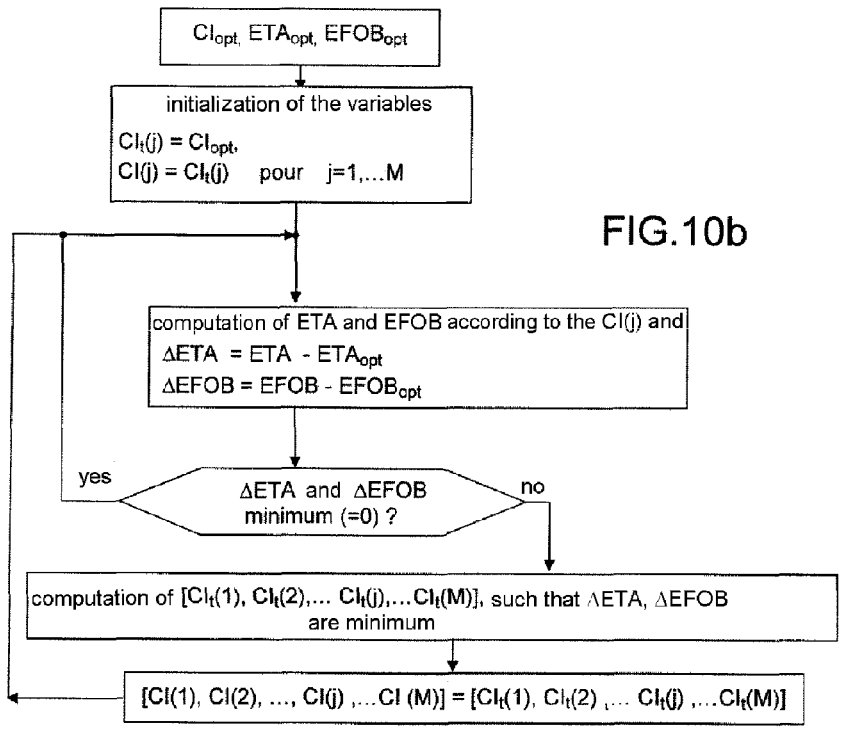

In practice, and as illustrated in FIG. 10b, the overriding loop initializes all the elementary cost indices CI(j) at the optimal cost index $CI_{opt}$ computed for this flight: this gives, on flight departure, $CI(j)=CI_{opt}$, $\forall j$.

On activation of the flight management system by detection of an external constraint $m_{ext}$ for modification of the flight instructions, the overriding loop will then recompute the M-uplet [CI(1), . . . CI(M)], such that the difference $\Delta ETA = ETA_m - ETA_{opt}$ and the difference $\Delta EFOB = \Delta EFOB_m - EFOB_{opt}$ are minimum, each CI(j) being applied to the corresponding flight segment j.

In FIG. 10b, a temporary M-uplet variable is therefore used $[CI_t(1), \ldots CI_t(M)]$, to obtain $\Delta ETA_{and}$ $\Delta EFOB$ minimum.

Figure 8A:
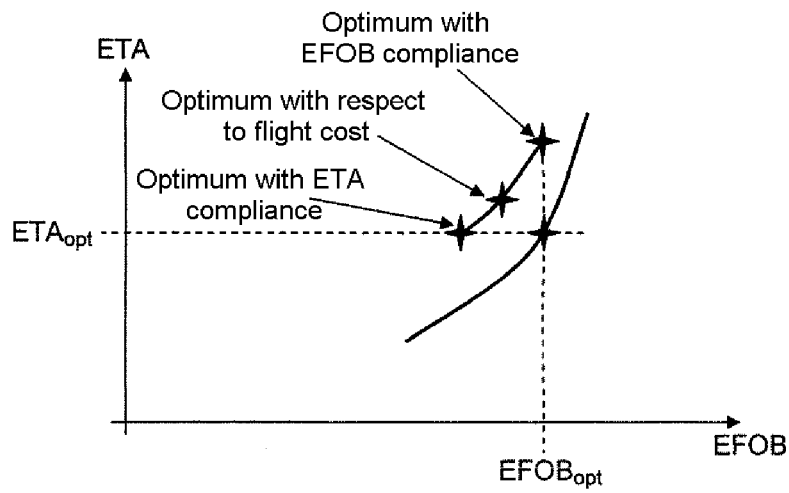
FIGS. 8a and 8b illustrate optimization curves according to the invention, depending on whether the compensation can be fully realized or partially realized because of a possible limitation of the field of the cost index values.

The invention that has just been described can be easily embodied in the flight management systems FMS by using numerical override techniques known to those skilled in the art and enables to constrain the real cost index of the mission executed to the optimal cost index predetermined by the aircraft operator, by acting on objectives $ETA_{opt}$ and $EFOB_{opt}$ of values of ETA and of EFOB to be achieved, objectives connected to this optimal cost index, while taking account of various constraints, both the constraints $m_{ext}$ that influence the real cost index, and those that limit the field of possible solutions (FIGS. 8a, 9a).

It therefore offers a real improvement for the flight management systems relative to the prior art.

The scope of the invention is not limited to the costs of the CI=CT/CF type, but extends to any type of more complex cost that could appear in future such as the cost of nuisance (emissions, noise) for example. It is sufficient to be able to express the cost parameters in the flight plan. The cost of nuisances of the noise type could for example be directly connected to a modelling of the noise level over a determined period, modelled onboard; the cost of emissions could be directly connected to a modelling of the $CO_2$ and NOx emissions as a function of the engine parameters and external conditions. It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by the definition contained in the appended claims and equivalent thereof.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of optimizing monitoring of a flight plan of an aircraft relative to a predetermined cost index predetermined by an operator, the flight plan including a determined set of waypoints to be overflown by the aircraft, the method implemented by a flight management system and comprising:

computing an optimal flight plan based on the predetermined cost index and computing optimal values of an arrival time and of a quantity of fuel remaining on board that are estimated to destination for the optimal flight plan and the predetermined cost index, the optimal flight plan defining for said determined set of waypoints a longitudinal speed profile and a vertical trajectory;

applying the optimal flight plan as the flight plan to be followed by the aircraft; and when at least one external constraint causes the flight plan followed by the aircraft to depart from the optimal flight plan, activating a corrective loop for overriding the flight plan to the predetermined cost index, wherein the corrective loop comprises:
computing current values of the arrival time and the quantity of fuel remaining estimated to destination for the flight plan,
detecting two differences including the difference of the current to the optimal values of an arrival time destination and the difference of the current to the optimal values of a quantity of fuel remaining on board at destination,
determining a corrective cost index based on an overriding criteria minimizing each of the two differences,
computing temporary corrections to the longitudinal speed profile and/or the vertical trajectory on at least a portion of the remaining flight plan based on said corrective cost index,
applying the temporary corrections based on said corrective cost index on said at least portion of the remaining flight plan, and then
applying the optimal flight plan based on the predetermined cost index for any remaining flight plan left.

2. The method according to claim 1, wherein
the optimal flight plan is computed relative to initial flight parameters comprising the optimal cost index, and
corrections to the current flight plan are computed relative to modified flight parameters comprising the corrective cost index and said at least one external constraint.

3. The method according to claim 1, wherein the overriding criteria uses a strategy based on a modellable cost in the flight management system, and the modellable cost includes at least one of a cost of the time, a cost of the fuel, or a cost of nuisance.

4. The method according to claim 1, wherein said determining is bound to a field of possible solutions defined by constraints including air traffic control constraints.

5. The method according to claim 4, wherein the field of possible solutions is defined by constraints including air traffic control and a required time slot at arrival constraints.

6. The method according to claim 1, wherein the corrective cost index is in a form of an M-uplet of M elementary corrective cost index, M being an integer at least equal to 2, each elementary corrective cost index being applied on an associated flight plan segment, each flight plan segment being a flight plan segment between two waypoints of the determined set of waypoints.

7. The method according to claim 6, further comprising:
segmenting the optimal flight plan into M segments, the segments being defined over one, several or all of the flight phases of the flight plan, and
associating with each segment j thus defined, j being an integer from 1 to M, of an elementary cost index on this segment, set at the value of the predetermined cost index,
wherein, on detection of one or more external constraints modifying the optimal flight plan, the overriding process supplies as an output a corrective elementary cost index M-uplet, each elementary corrective cost index having to be applied as a new elementary cost index on the associated flight plan segment.

8. The method according to claim 7, wherein the number M is chosen according to the flight time.

9. The method according to claim 7, wherein there are as many segments j as branches between waypoints and points characteristic of the flight phases that are segmented.

10. The method according to claim 7, wherein M is at least equal to 3, defined on a climb phase, a cruise phase and a descent phase of the optimal flight plan, with a first segment 1 corresponding to the climb flight phase, N segments on the cruise flight phase, N being an integer at least equal to 1 and an Mth segment M corresponding to the descent flight phase.

11. The method according to claim 7, wherein M is equal to 2, the dividing step defining two segments on the cruise phase of the optimal flight plan.

12. A flight management system of an aircraft using a method of optimizing monitoring of a flight plan including a determined set of waypoints to be overflown by the aircraft, with respect to a predetermined cost index, the predetermined cost index predetermined by an operator, the method comprising:
computing an optimal flight plan based on the predetermined cost index and computing optimal values of an arrival time and of a quantity of fuel remaining on board that are estimated to destination for the optimal flight plan and the predetermined cost index, the optimal flight plan defining for said determined set of waypoints a longitudinal speed profile and a vertical trajectory;
applying the optimal flight plan as the flight plan to be followed by the aircraft; and
when at least one external constraint causes the flight plan followed by the aircraft to depart from the optimal flight plan, activating a corrective loop for overriding the flight plan to the predetermined cost index, wherein the corrective loop comprises:
computing current values of the arrival time and the quantity of fuel remaining estimated to destination for the modified flight plan,
detecting two differences including the difference of the current to the optimal values of an arrival time destination and the difference of the current to the optimal values of a quantity of fuel remaining on board at destination,
determining a corrective cost index based on an overriding criteria minimizing each of the two differences,
computing temporary corrections to the longitudinal speed profile and/or the vertical trajectory on at least a portion of the remaining flight plan based on the corrective cost index,
applying temporary corrections based on said corrective cost index on said at least a portion of the remaining flight plan, and then
applying the optimal flight plan based on the predetermined cost index for any remaining flight plane and flight time left.

13. The flight management system according to claim 12, wherein the corrective cost index is in a form of an M-uplet of M elementary corrective cost index, each elementary corrective cost index being applied on an associated flight plan segment each flight plan segment being a flight plan segment between two waypoints of the determined set of waypoints.

14. The method according to claim 2, wherein the overriding criteria uses a strategy based on a modellable cost in the flight management system, and the modellable cost includes at least one of a cost of the time, a cost of the fuel, or a cost of nuisance.

* * * * *